US011022241B2

(12) United States Patent
Cladiere et al.

(10) Patent No.: US 11,022,241 B2
(45) Date of Patent: Jun. 1, 2021

(54) DEVICE FOR LIMITING THE LOOSENING OF A NUT IN A TURBINE ENGINE

(71) Applicant: Safran Helicopter Engines, Bordes (FR)

(72) Inventors: Mathieu Cladiere, Pau (FR); Cedric Roger Zordan, Narcastet (FR); Stephane Vergez, Aast (FR)

(73) Assignee: Safran Helicopter Engines, Bordes (FR)

(*) Notice: Subject to any disclaimer, the term of this patent is extended or adjusted under 35 U.S.C. 154(b) by 397 days.

(21) Appl. No.: 15/779,584

(22) PCT Filed: Dec. 1, 2016

(86) PCT No.: PCT/FR2016/053163
§ 371 (c)(1),
(2) Date: May 29, 2018

(87) PCT Pub. No.: WO2017/093671
PCT Pub. Date: Jun. 8, 2017

(65) Prior Publication Data
US 2019/0271421 A1  Sep. 5, 2019

(30) Foreign Application Priority Data

Dec. 3, 2015  (FR) ..................................... 15 61809

(51) Int. Cl.
*F16L 19/00* (2006.01)
(52) U.S. Cl.
CPC ................................ *F16L 19/005* (2013.01)
(58) Field of Classification Search
CPC ......... F16L 19/005; F16L 15/08; F16B 39/04; F16B 39/08
(Continued)

(56) References Cited

U.S. PATENT DOCUMENTS 8,365,754 B2 * 2/2013 Riley ...................... F04B 53/22
137/15.17
2015/0000096 A1 * 1/2015 Gilbreath .............. F16L 19/005
29/426.1
(Continued)

FOREIGN PATENT DOCUMENTS

DE    29 03 706 A1    8/1980
EP    0427660 A2 *  5/1991   ............ F16L 19/005
(Continued)

OTHER PUBLICATIONS

International Search Report dated Mar. 8, 2017 in PCT/FR2016/053163 filed Dec. 1, 2016.
(Continued)

*Primary Examiner* — Matthew Troutman
*Assistant Examiner* — Fannie C Kee
(74) *Attorney, Agent, or Firm* — Oblon, McClelland, Maier & Neustadt, L.L.P.

(57) ABSTRACT

An assembly for a turbine engine. The assembly includes a mount, a nut clamping around the male portion of the mount, a member projecting from the mount and a device for limiting loosening of the nut. The loosening limitation device includes a member for locking the nut against rotation relative to the mount. The rotation locking member includes an inner surface designed to limit rotation of the nut with shape engagement with an outer surface of the nut. The rotation locking member includes a first anti-rotation abutment designed to rotatably abut against the projecting member. The loosening limitation device includes a translation locking member designed to limit translation of the rotation locking member relative to the nut.

14 Claims, 3 Drawing Sheets

(58) Field of Classification Search
USPC .................................................. 285/91–92
See application file for complete search history.

(56) References Cited

U.S. PATENT DOCUMENTS

2015/0084329 A1* 3/2015 Freudendahl ........... F16L 37/53
285/91
2015/0115184 A1* 4/2015 Allott .................... F16L 29/002
251/148

FOREIGN PATENT DOCUMENTS

FR       2 901 331 A1    11/2007
WO    WO-2006108724 A1 * 10/2006 ............ F16L 19/005

OTHER PUBLICATIONS

Preliminary French Search Report dated Sep. 8, 2016 in French Application 1561809 filed Dec. 3, 2015.

* cited by examiner

DEVICE FOR LIMITING THE LOOSENING OF A NUT IN A TURBINE ENGINE

TECHNICAL FIELD

The invention relates to turbine engines for aircraft such as turbojet engines and turboprop engines. More specifically, the invention relates to a device for limiting the loosening of a nut in a turbine engine.

PRIOR ART

Some oil pipes are connected using a nut to an orifice opening out into a turbine engine casing.

A known method for limiting the loosening of the nut involves the use of a lockwire wound around the nut. Such a lockwire can be difficult to install, in particular as a result of the layout in the vicinity of the turbine engine casing.

The nut can also be locked using self-locking wire thread inserts. Such inserts can generate tightening torques that are not compatible with the mechanical strength of the parts with which they have a mechanical interface.

DESCRIPTION OF THE INVENTION

The purpose of the invention is to at least partially overcome the problems encountered in the solutions of the prior art.

In this respect, the invention relates to an assembly for a turbine engine, comprising a mount comprising a threaded male portion, in addition to a member projecting from the mount and secured to the mount. The assembly further comprises a nut clamping around the male portion and a device for limiting loosening of the nut relative to the mount.

According to the invention, the loosening limitation device comprises a rotation locking member and a translation locking member, the rotation locking member being configured to limit rotation of the nut relative to the mount, the rotation locking member comprising an inner surface configured to limit rotation of the nut by means of shape engagement with an outer surface of the nut, the rotation locking member comprising a first anti-rotation abutment configured to rotatably abut against the projecting member so as to limit rotation of the rotation locking member relative to the mount, and the translation locking member being configured to limit translation of the rotation locking member relative to the nut, along the axis of the nut.

With the invention, the loosening limitation device limits the unexpected loosening of the nut, while easing the installation of the loosening limitation device.

It is easier to install around the nut than a lockwire. The first anti-rotation abutment also allows the correct assembly direction of the loosening limitation device to be more easily identified.

The loosening limitation device is mechanically connected to the nut in a removable manner, which eases maintenance operations on the assembly, after the installation thereof in a turbine engine.

Finally, the shape engagement between the inner surface of the rotation locking member and the outer surface of the nut limits errors when assembling the loosening limitation device.

The invention can comprise, in an optional manner, one or more of the following characteristics, taking independently or in a combination thereof.

Advantageously, the rotation locking member comprises a second anti-rotation abutment configured to rotatably abut against the projecting member, such that the projecting member is located between the first anti-rotation abutment and the second anti-rotation abutment.

According to a feature, the first abutment and/or the second abutment comprise a lug.

According to another feature, the projecting member comprises a screw and/or a base plate.

According to an advantageous embodiment, the angular range between the two anti-rotation abutments is greater than or equal to the sum of the angular range of at least one portion of the projecting member and an angle between two consecutive sides of the rotation locking member.

Advantageously, the inner surface is polygonal.

Preferably, the inner surface is multi-hexagonal in order to engage with an outer hexagonal surface of the nut.

According to a feature, the rotation locking member comprises an opening for at least partially housing the translation locking member. Said opening is preferably a groove.

According to an additional feature, the translation locking member comprises a clamping member.

Advantageously, the clamping member comprises a pin, a clasp, a clip and/or a circlip.

The invention further relates to a turbine engine comprising an assembly as disclosed hereinabove, whereby the nut connects an oil line to a male portion that is secured to a turbine engine casing.

Preferably, the turbine engine is an aircraft turbine engine such as a turbojet engine or a turboprop engine.

The invention further relates to a method for assembling a loosening limitation device of an assembly as disclosed hereinabove, comprising the steps of:

inserting the rotation locking member around the nut and mounting the first anti-rotation abutment such that it is abutted against the projecting member, and mounting the translation locking member such that the translation locking member limits translation of the rotation locking member relative to the nut, along the axis of the nut.

BRIEF DESCRIPTION OF THE FIGURES

This invention will be better understood after reading the following description of example embodiments, given for purposes of illustration only and not intended to limit the scope of the invention, and with reference to the accompanying figures, wherein.

DETAILED DESCRIPTION OF THE SPECIFIC EMBODIMENTS

Figure 1:
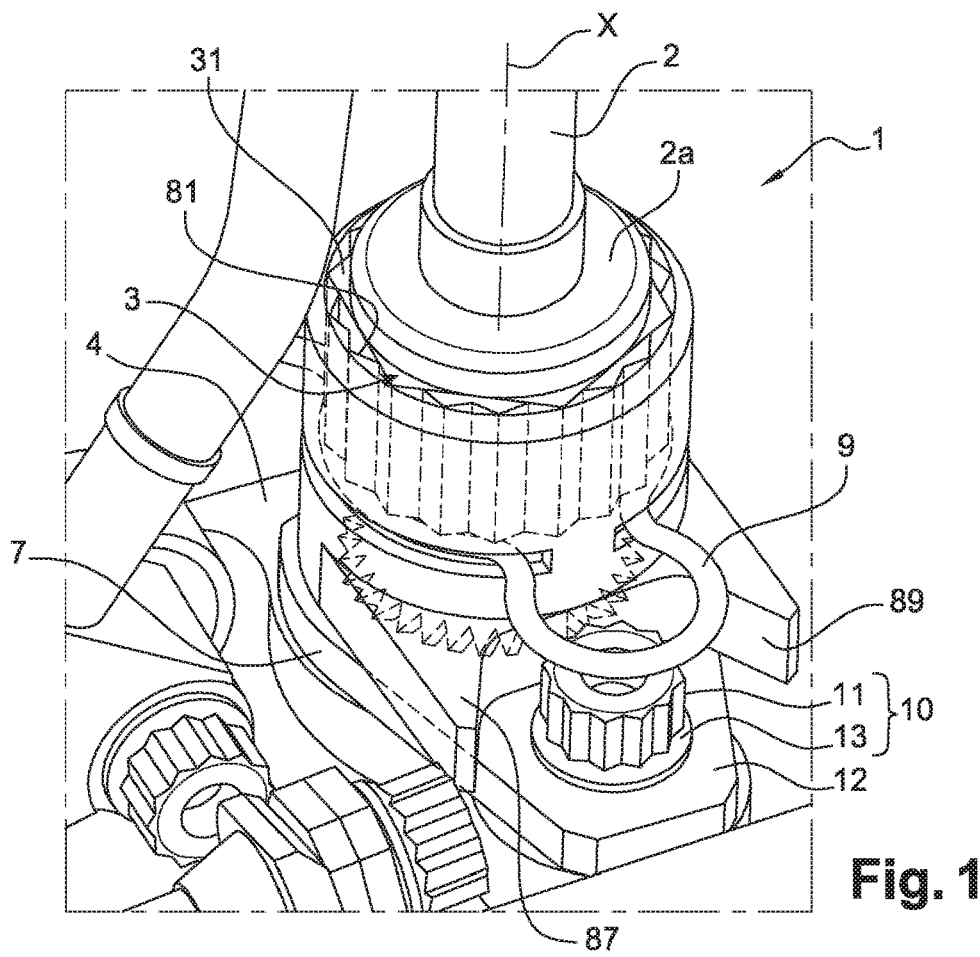
FIG. 1 is a partial, diagrammatic view of an assembly for a turbine engine comprising a device for limiting the loosening of a nut, according to a first embodiment of the invention.

Identical, similar or equivalent parts in the different figures bear the same reference numerals in order to ease the passage from one figure to another.

Figure 7:
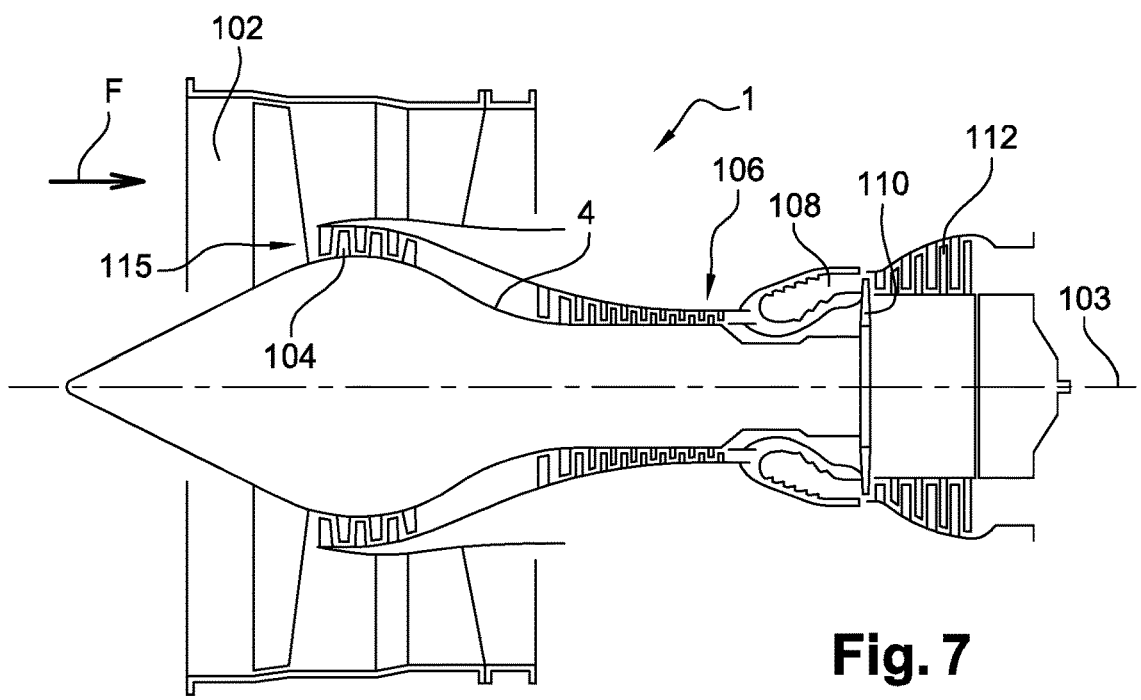
FIG. 7 shows an aircraft turbine engine comprising an assembly according to the first embodiment.

FIG. 7 shows an aircraft turbine engine 1 that is, in this case, a bypass and twin-spool turbojet engine.

The turbine engine 1 has a longitudinal axis 103 about which extend the different components thereof. It comprises, upstream to downstream in a main direction of flow of the gases shown by the arrow F, a fan 102, a low-pressure compressor 104, a high-pressure compressor 106, a combustion chamber 108, a high-pressure turbine 110 and a low-pressure turbine 112.

The low-pressure compressor 104, the high-pressure compressor 106, the combustion chamber 108, the high-pressure turbine 110 and the low-pressure turbine 112 are delimited by casings 4 to form a primary duct 115 of the turbine engine 1.

Figure 2:
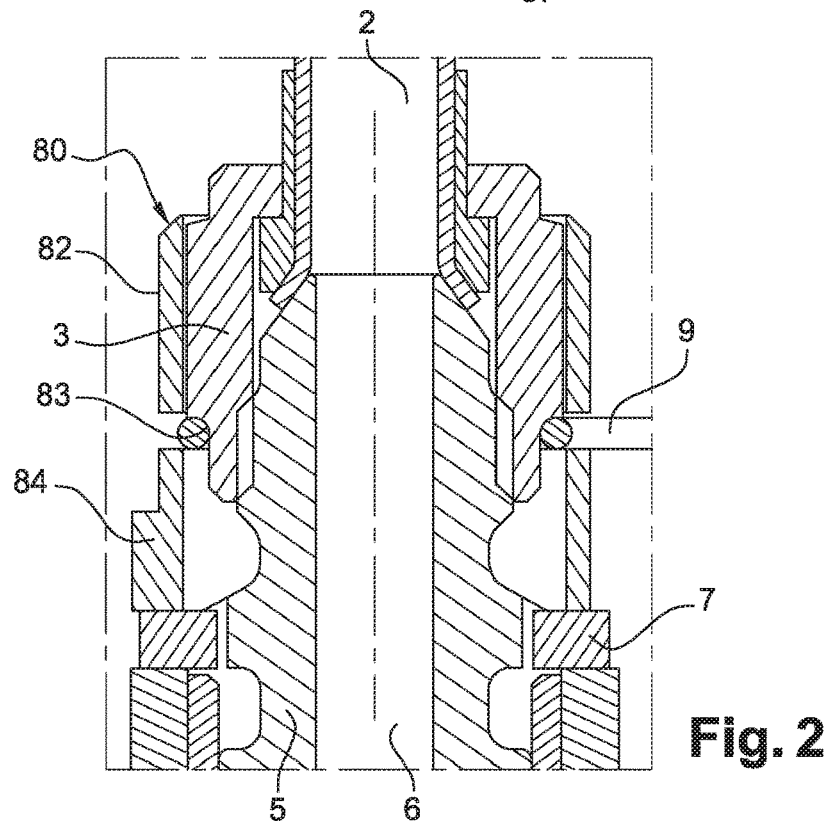
FIG. 2 is a partial, diagrammatic view showing a longitudinal section of a first oil line connected to a second oil line by a nut, inside the assembly according to the first embodiment.
Figure 3:
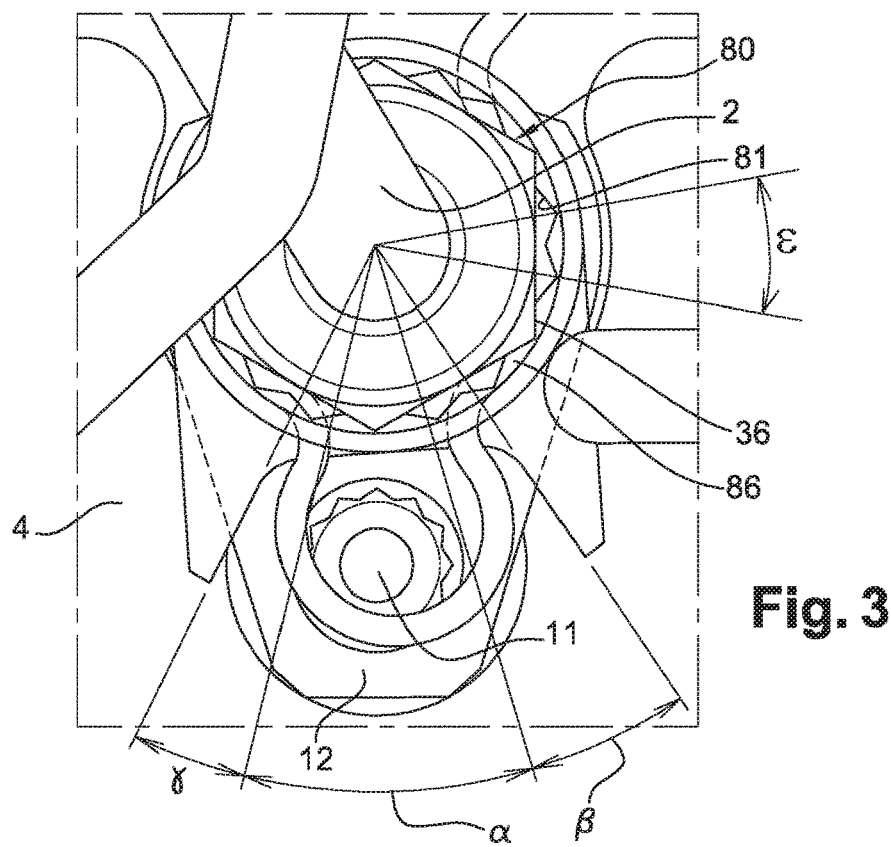
FIG. 3 is a partial, overhead, diagrammatic view of the assembly according to the first embodiment.

FIGS. 1 to 3 show an assembly for an aircraft turbine engine 1 that comprises the turbine engine casing 4. Said casing 4 is an upstream casing or an intermediate casing that takes part in delimiting the primary duct 115.

The assembly comprises a first oil line 2 that is connected to a second oil line 6 by a nut 3. The lower end 2a of the first line 2 comprises the nut 3 and a groove 2b, shown in FIG. 4, that is located at the lower portion of the nut 3.

In the assembly disclosed, the terms "lower" and "upper" are defined, in a relative manner to one another, with reference to the figures. In the embodiment shown, a "lower" portion of an element is closer to the longitudinal axis of the turbine engine 1 than the "higher" position of the same element.

Moreover, unless specified otherwise, the adjectives and adverbs "axial" and "radial" are used to define directions relative to the X-X axis of the nut. An axial direction is a direction that is parallel to the X-X axis of the nut, whereas a radial direction is orthogonal to the X-X axis of the nut.

The second line 6 is located in the continuation of the first line 2. It is fixed relative to the casing 4 through which it passes. It is surrounded by a threaded enclosure 5, such that the second line 6 and the enclosure 5 form a male portion that is clamped by the nut 3.

The assembly further comprises a brake plate 7 located around the enclosure 5 and that is in mechanical contact with the casing 4.

Said plate 7 is secured to the casing 4 by a clamping screw 11. It forms a base plate 12 for the rotation locking member 8 of the nut, which is described hereafter.

A washer 13 is located between the base plate 12 and the head of the screw 11. The washer 13 and the screw head 11 jointly form a projecting member 10 projecting from the casing 4 and from the brake plate 7.

The nut 3 is surrounded by the rotation locking member 8 thereof, which is clamped by a hairpin cotter 9. The rotation locking member 8 and the hairpin cotter 9 jointly form a device for limiting the loosening of the nut 3.

The rotation locking member 8 comprises a main body 80 that substantially has the shape of an annular ring, with the exception of a first lug 87 and of a second lug 89. The main body 80 is located around the first line 2.

The main body 80 comprises an upper portion 82, a lower portion 84 and a groove 83 between the upper portion 82 and the lower portion 84.

The upper portion 82 surrounds the nut 3. It comprises a trihexagonal inner surface 81 that faces a hexagonal outer surface 31 of the nut 3. The teeth 86 of the inner surface 81 mechanically engage the teeth 36 delimited by the outer surface 31. The engagement of said teeth 36, 86 limits rotation of the nut 3 relative to the rotation locking member 8.

The maximum angular range γ for loosening the nut 3 is at most equal to the angular range ε between two consecutive teeth 86 of the inner surface 81 of the main body 80.

The maximum loosening angular range γ lies, for example, in the range 0°, when the assembly margin β for assembling the rotation locking member 8 relative to the nut 3 is equal to about 20°, to 20°, when said assembly margin β is equal to about 0°.

The lower portion 84 has an annular ring-shaped body. The lower portion 84 comprises the two lugs 87, 89 that radially project outwards relative to said body.

The lower portion 84 bears against the brake plate 7 below the lugs 87, 89. The brake plate 7 is thus an axial abutment of the lower portion 84.

The first lug 87 and the second lug 89 are spaced apart from one another in a circumferential direction of the main body 80. The screw 11 is intended to be located between the first lug 87 and the second lug 89.

The first lug 87 and the second lug 89 limit rotation of the rotation locking member 8 relative to the casing 4. They thus perform the role of an anti-rotation abutment for the rotation locking member 8 relative to the casing 4. The screw 11 thus forms an anti-rotation counter-abutment for the rotation locking member 8. The rotation locking member 8 is mechanically connected in a removable manner to the nut 3, to the casing 4 and to the brake plate 7.

The angular range γ+β+α between the two lugs 87, 89 is greater than or equal to the angular range α of the screw 11. It is preferably greater than or equal to the sum of the angular range α of the screw 11 and the angular range ε between two consecutive teeth 86 of the rotation locking member 8, in order to ease the installation of the rotation locking member 8 about the nut 3.

The angular range α of the screw 11 is, for example, 30°. The angular range γ+β+α between the two lugs 87, 89 is, for example, 50°.

The groove 83 is a slot that passes through the main body 80 over the majority of the circumference of the main body 80.

Said groove 83 houses the hairpin cotter 9. It is located in the lower portion of the nut 3, facing the groove 2b when the rotation locking member 8 is in position around the nut 3.

The hairpin cotter 9 is located beneath the nut 3, when the loosening limitation device has been installed. It clamps around the main body 80 and clamps around the nut 3 at the groove 2b thereof.

The hairpin cotter 9 is connected in a removable manner to the rotation locking member 8 and to the nut 3.

It prevents translation of the rotation locking member 8 relative to the nut 3 along the X-X axis of the nut.

Figures 4, 5:
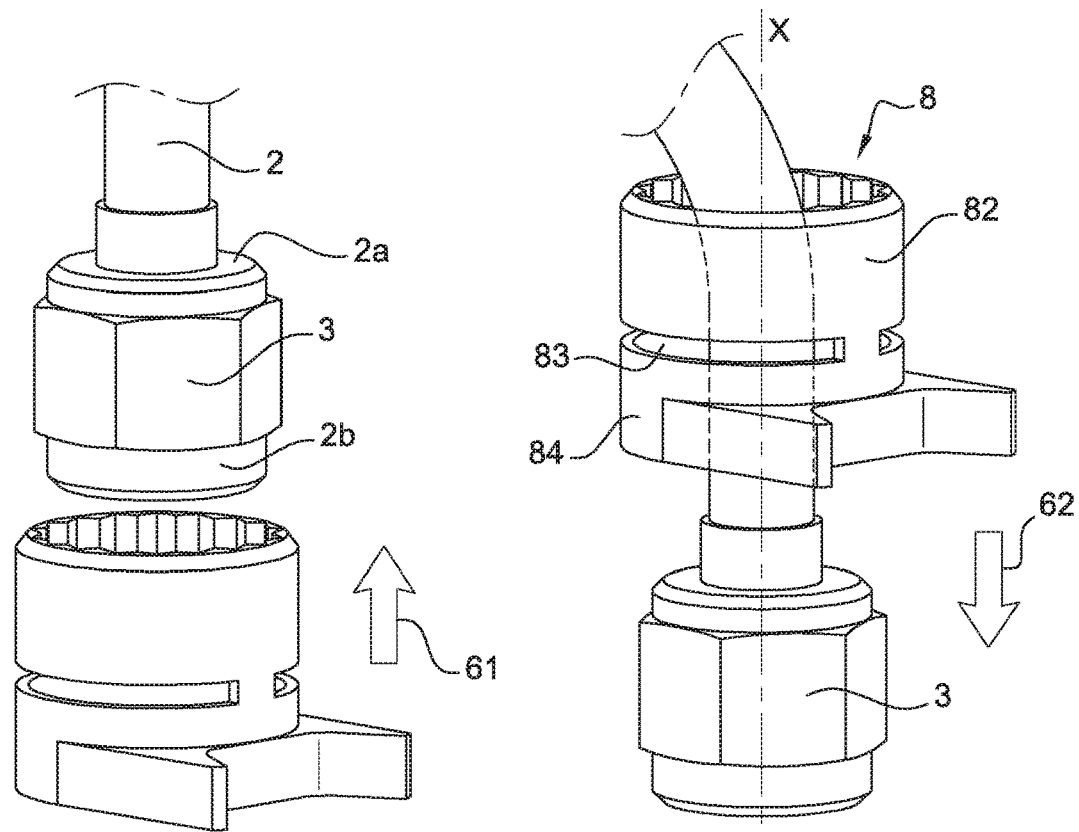
FIG. 4 shows the insertion of a rotation locking member around the nut, inside the assembly according to the first embodiment.
FIG. 5 shows the position of the rotation locking member when tightening the nut, inside the assembly according to the first embodiment.
Figure 6:
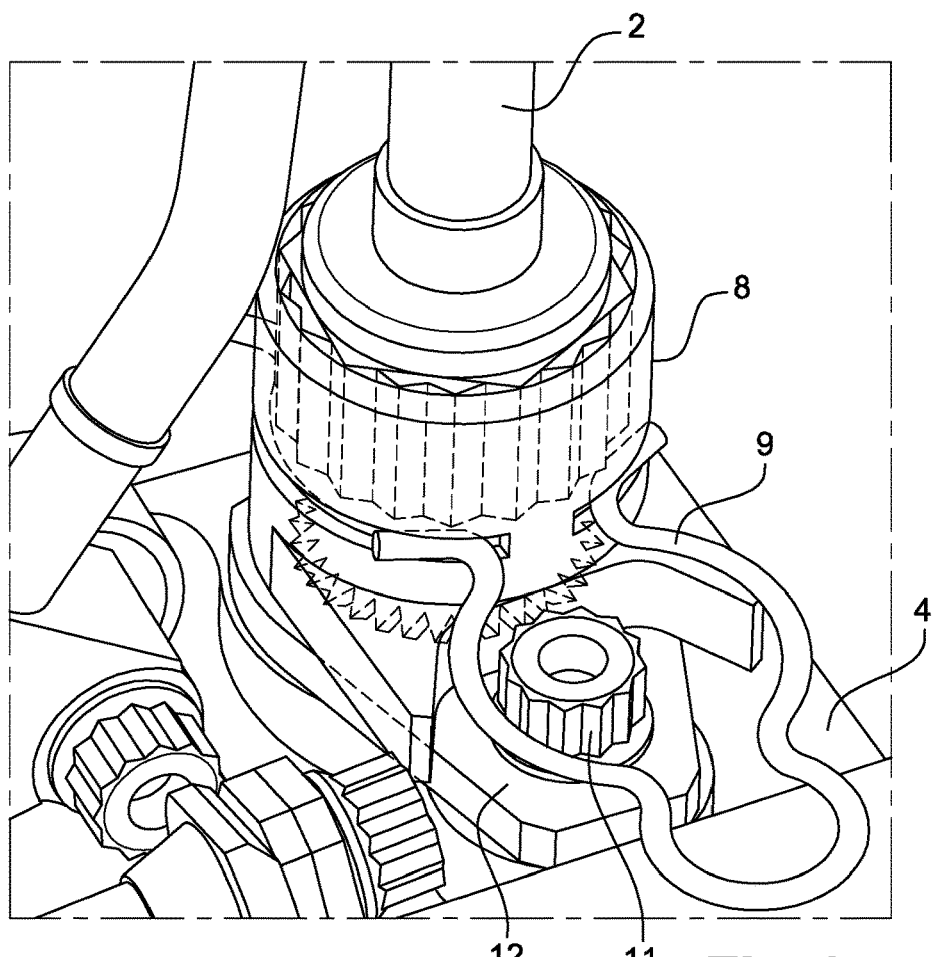
FIG. 6 shows the assembly of the translation locking member, once the rotation locking member has been installed, in the assembly according to the first embodiment.

The method for mounting the loosening limitation device is shown with reference to FIGS. 4 to 6.

Firstly, the rotation locking member 8 is inserted along the nut 3 from beneath the lower end 2a in an upwards direction, according to the arrow 61.

The rotation locking member 8 is located above the end 2a of the first line 2 when tightening the nut 3, so as to ease access to the nut 3 in order to connect the first line 2 and the second line 6.

Once the nut 3 has been tightened, the rotation locking member 8 is directed downwards according to the arrow 62, such that the upper portion 82 surrounds the nut 3. The lower portion bears against the brake plate 7. The projecting member 10 is located between the two lugs 87, 89, while being capable of rotatably abutting against the lugs 87, 89.

The hairpin cotter 9 is then inserted into the groove 83 between the upper portion 82 and the lower portion 84 of the rotation locking member 8. The rotation locking member 8 is thus blocked in translation along the X-X axis of the nut. It is also clamped around the end 2a of the nut 3.

Of course, various changes can be made to the invention described hereinabove by those skilled in the art without leaving the scope of the invention. The lugs 87, 89 can engage with the head of the screw 11 and/or with a portion of the shank of the screw 11 in order to limit the rotation of the rotation locking member 8 relative to the mount 4.

For example, the first line 2 and the second line 6 can carry exhaust air, fuel or any other type of fluid, instead of oil. Moreover, the second line 6 can take on the form of an orifice passing through the casing 4, without extending on either side of the casing 4.

The nut 3 can be connected in a removable manner to the first line 2, instead of forming a part of the first line 2.

The rotation locking member 8 could also limit other types of movements of the nut 3 relative to the mount 4, in addition to a rotational movement of the nut 3 relative to the mount 4.

The inner surface 81 is trihexagonal, however it could also be hexagonal, in order to limit rotation of the nut 3 by complementary of shape with the outer surface 31 of the nut.

Generally, the inner surface 81 and the outer surface 31 are shaped so as to chock the rotation of the nut 3 and the rotation locking member 8.

They are in particular shaped such that the maximum angular range γ for loosening the nut 3 is less than the angular range £ between two consecutive teeth 86 of the rotation locking member 8.

The hairpin cotter 9 is capable of being replaced by another type of pin, by a clasp, a clip and/or a circlip.

It can also be located in a position that is not in the groove 83, for example above the rotation locking member 8, while clamping around the first oil line 2.

In such a case, the rotation locking member 8 can even be devoid of the groove 83.

The invention claimed is:

1. An assembly for a turbine engine, comprising:
   a mount comprising a threaded male portion,
   a projecting member projecting from the mount, wherein the projecting member is secured to the mount,
   a nut clamping around the male portion, and
   a device for limiting loosening of the nut relative to the mount,
   wherein the projecting member comprises a screw,
   wherein the loosening limitation device comprises:
      a rotation locking member configured to limit rotation of the nut relative to the mount, wherein the rotation locking member comprises:
         an annular ring surrounding the nut, and
         a first lug and a second lug that radially project outwards from a body of the annular ring, wherein the first and second lugs are spaced apart from one another in a circumferential direction of the annular ring,
      wherein the annular ring comprises an inner surface configured to limit rotation of the nut by shape engagement with an outer surface of the nut,
      wherein the rotation locking member is configured to retain the screw between the first and second lugs, wherein each of the first and second lugs is configured to form an anti-rotation abutment for the screw, so as to limit rotation of the rotation locking member relative to the mount, and
   wherein the device for limiting loosening comprises a translation locking member configured to limit translation of the rotation locking member relative to the nut, along an axis of the nut, wherein the translation locking member comprises a clamping member.

2. The assembly according to claim 1, wherein an angular range between the two lugs is greater than or equal to the sum of an angular range of the screw and an angle between two consecutive sides of the rotation locking member.

3. The assembly according to claim 1, comprising a brake plate in contact with the mount and the rotation locking member, wherein the brake plate is secured to the mount by the screw.

4. The assembly according to claim 1, wherein the inner surface is polygonal in order to engage with an outer hexagonal surface of the nut.

5. The assembly according to claim 4, wherein the inner surface is multi-hexagonal.

6. The assembly according to claim 1, wherein the annular ring comprises an opening for at least partially housing the translation locking member.

7. The assembly according to claim 6, wherein the opening comprises a groove.

8. The assembly according to claim 1, wherein the clamping member comprises at least one of a pin, a clasp, a clip, or a circlip.

9. The assembly according to claim 1, wherein the annular ring includes an upper portion and a lower portion, the upper portion including the inner surface configured to limit rotation of the nut by shape engagement with the outer surface of the nut, and the first and second lugs radially project outwards from the lower portion.

10. The assembly according to claim 1, wherein the mount is a casing of the turbine engine, the casing delimiting a primary duct of the turbine engine.

11. A turbine engine comprising an assembly according to claim 1, wherein the nut connects an oil line to the male portion that is secured to a turbine engine casing.

12. A method for assembling a loosening limitation device of an assembly comprising:
   a mount comprising a threaded male portion,
   a projecting member projecting from the mount, wherein the projecting member is secured to the mount,
   a nut clamping around the male portion, and
   a device for limiting loosening of the nut relative to the mount,
   wherein the projecting member comprises a screw,
   wherein the loosening limitation device comprises:
      a rotation locking member configured to limit rotation of the nut relative to the mount, wherein the rotation locking member comprises:
         an annular ring surrounding the nut, and
         a first lug and a second lug that radially project outwards from a body of the annular ring, wherein the first and second lugs are spaced apart from one another in a circumferential direction of the annular ring, wherein the annular ring comprises an inner surface configured to limit rotation of the nut by shape engagement with an outer surface of the nut, wherein the rotation locking member is configured to retain the screw between the first and second lugs, wherein each of the first and second lugs is configured to form an anti-rotation abutment for the screw, so as to limit rotation of the rotation locking member relative to the mount, wherein the device for limiting loosening comprises a translation locking member configured to limit translation of the rotation locking member relative to the nut, along an axis of the nut, wherein the translation locking member comprises a clamping member, wherein the method comprises:

inserting the rotation locking member around the nut and mounting the screw between the first lug and the second lug, and mounting the translation locking member such that the translation locking member limits translation of the rotation locking member relative to the nut, along the axis of the nut.

13. The method according to claim 12, wherein the annular ring includes an upper portion and a lower portion, the upper portion including the inner surface configured to limit rotation of the nut by shape engagement with the outer surface of the nut, and the first and second lugs radially project outwards from the lower portion.

14. The method according to claim 12, wherein the mount is a casing of the turbine engine, the casing delimiting a primary duct of the turbine engine.

* * * * *